United States Patent
Choquet et al.

(10) Patent No.: US 6,178,324 B1
(45) Date of Patent: Jan. 23, 2001

(54) METHOD OF ADAPTING THE OPERATION OF A SUBSCRIBER IDENTITY MODULE TO ONE OR MORE INTERFACES OF A MOBILE RADIOCOMMUNICATIONS TERMINAL, A CORRESPONDING SUBSCRIBER IDENTITY MODULE, AND A CORRESPONDING MOBILE TERMINAL

(75) Inventors: Christophe Choquet; Pascal Hubbe, both of Paris; Anne-Gaëlle Lelong-Gilbert, Viroflay, all of (FR)

(73) Assignee: Alcatel, Paris (FR)

( * ) Notice: Under 35 U.S.C. 154(b), the term of this patent shall be extended for 0 days.

(21) Appl. No.: 09/127,682

(22) Filed: Jul. 31, 1998

(30) Foreign Application Priority Data

Aug. 4, 1997 (FR) .................................. 97 09947

(51) Int. Cl.$^7$ ........................................ H04Q 7/20
(52) U.S. Cl. ............................ 455/422; 455/558
(58) Field of Search .................... 455/558, 422, 455/418; 235/380

(56) References Cited

U.S. PATENT DOCUMENTS 5,404,580 * 4/1995 Simpson et al. .................... 455/558
5,630,159 * 5/1997 Zancho ................................ 455/558
5,633,484 * 5/1997 Zancho et al. ...................... 235/380
5,999,827 * 12/1999 Sudo et al. .......................... 455/566

OTHER PUBLICATIONS

Digital Cellular Telecommunications System Specfication of the SIM Application Toolkit for the Subscriber Identity Module–Mobile Equipment Interface (GSM 11.14 verison 5.4.0) Jul. 1997.

* cited by examiner

Primary Examiner—Daniel S. Hunter
Assistant Examiner—Myron K. Wyche
(74) Attorney, Agent, or Firm—Sughrue, Mion, Zinn, Macpeak & Seas, PLLC

(57) ABSTRACT

A method of adapting the operation of a subscriber identity module as a function of information received from a mobile radio communications terminal concerning one or more interfaces of the mobile radio communications terminal. The subscriber identity module transmits an interface information acquisition command to the communications terminal. Upon reception of the interface information acquisition command, the terminal executes the interface information acquisition command to generate a reply containing interface information which is transmitted to the subscriber identity module. Upon reception of the reply, the subscriber identity module adapts its operation as a function of the interface information contained in the reply.

7 Claims, 2 Drawing Sheets

METHOD OF ADAPTING THE OPERATION OF A SUBSCRIBER IDENTITY MODULE TO ONE OR MORE INTERFACES OF A MOBILE RADIOCOMMUNICATIONS TERMINAL, A CORRESPONDING SUBSCRIBER IDENTITY MODULE, AND A CORRESPONDING MOBILE TERMINAL

FIELD OF THE INVENTION

The present invention relates to radio communication systems and particularly, but not exclusively, to systems such as the Global System for Mobile communications (GSM), and the Digital Cellular System (DCS) 1800.

In general, in such a system, the user has a mobile station constituted by a mobile terminal which cooperates with a subscriber identity module (referred to as a "SIM card" in the GSM Standard). Generally, the SIM card is a smart card designed to be inserted into a mobile terminal to enable the terminal to be used.

More precisely, the invention relates to a method enabling the operation of a subscriber identity module to be adapted to one or more interfaces of the mobile terminal with which it co-operates.

BACKGROUND OF THE INVENTION

Conventionally, mobile terminals offer certain facilities, in particular making it possible to access services. Such facilities are, for example:

storing data of the telephone directory type, thereby facilitating access both to "basic" services and to "operator added value" services (such as, in particular, interactive services);

performing operations on "additional" services (such as, for example, call forwarding, incoming calls only, etc.); and in mobile radio networks offering a telephony service, a service for transmitting short alphanumeric messages, together with the storing short alphanumeric messages to be transmitted or to be received by the mobile terminals.

Originally, the data relating to such facilities was stored in the mobile terminal itself. Subsequently, to obtain greater flexibility, it was proposed to store this data in the subscriber identity module.

Thus, GSM Recommendation 11.11 recommends storing the data relating to the facilities in predefined memory zones of the SIM card in the same manner as the data relating to subscriber identity is stored to ensure that the card is compatible with the various types of GSM mobile terminals suitable for receiving it.

By means of the European Telecommunications Standard (ETS), the interface between the subscriber identity module and the mobile terminal ensures that these two elements are interoperable independently of the respective manufacturers and of the operators. Thus, it is possible to take advantage of the facilities from any mobile terminal that is suitable for co-operating with such a subscriber identity module.

However, a major drawback remains. When the subscriber identity module sends a command to one or more interfaces, it does not, prior to sending the command, make sure that the type(s) of interface used can recognize the command that is sent, in particular as regards the type of graphics display. As a result, it is possible that the subscriber identity module might send commands to the terminal with which it co-operates, but that cannot be recognized by the terminal.

OBJECTS AND SUMMARY OF THE INVENTION

A particular object of the present invention is to mitigate that major drawback of the prior art.

More precisely, an object of the present invention is to provide a method of adapting the operation of a subscriber identity module to one or more interfaces of a mobile radio communication terminal. Another object of the invention is to provide a subscriber identity module and a mobile terminal that enable such a method to be implemented.

An additional object of the invention is to provide such a method, such a subscriber identity module, and such a mobile terminal that make it possible to optimize the use of the resources available on the mobile terminal used.

Another additional object of the invention is to provide such a method, such a subscriber identity module, and such a mobile terminal that make it possible to ignore the differences in the types of mobile terminals used.

These objects and others that appear below are achieved by the invention by means of a method of adapting the operation of a subscriber identity module as a function of "interface" information concerning at least one of the interface(s) of a mobile radio communications terminal with which said subscriber identity module co-operates the method comprising the following steps:

said subscriber identity module transmits an interface information acquisition command to said terminal;

said terminal receives and executes said interface information acquisition command so as to generate a reply containing interface information;

said terminal transmits said reply to said subscriber identity module; and said subscriber identity module receives said reply and adapts its operation as a function of the contents of said reply.

The general principle of the invention is thus based on adding an interface information acquisition command enabling a subscriber identity module to retrieve the information concerning one or more interfaces used by the mobile terminal with which it co-operates. The interfaces define, in particular, the ergonomic characteristics of the terminal.

The interface information acquisition command which is stored in the subscriber identity module is independent of the type of terminal with which the subscriber identity module is to co-operate.

Clearly, the subscriber identity module may send different successive interface information acquisition commands at different times, so as, in particular, to obtain different kinds of interface information.

In a preferred implementation of the invention, said interface information belongs to the group comprising:

the type of display of said terminal;

the size of the screen of said terminal;

the size in text terms of the screen of said terminal;

the type of keypad of said terminal;

the range of sound frequencies that said terminal is capable of generating; and the range of sound frequencies that said terminal is capable of receiving.

Naturally, this list is not limiting.

It should be noted that the invention does not put any constraints on the form and the type of the interface information. Similarly, the invention does not put any constraint on the number and the types of the interfaces used by the mobile terminal.

Clearly, a reply may contain various kinds of interface information.

Advantageously, said interface information acquisition command is a command additional to a set of commands in the protocol for dialog between said terminal and said subscriber identity module.

Advantageously, during a prior step, said terminal indicates to said subscriber identity module whether or not it is capable of executing said interface information acquisition command.

This prevents the subscriber identity module from sending unnecessarily a command that cannot be recognized by the interfaces used by the mobile terminal. The prior step corresponds, for example, to an initialization step or to a step performed at any other time, in particular when the subscriber identity module needs interface information. It is advantageous to be aware of whether or not the terminal is capable of executing the interface information acquisition command. This applies particularly before the subscriber identity module sends a command to the terminal to implement the interface(s) about which the information has been gathered.

The invention also provides a subscriber identity module of the type designed to co-operate with a mobile radiocommunications terminal. This subscriber identity module includes:

means for transmitting an acquisition command to said terminal to acquire "interface" information concerning the or at least one of the interface(s) of said terminal;

means for receiving a reply sent to it by said terminal in response to transmission of said acquisition command, said reply containing interface information; and means for adapting its operation as a function of the contents of said reply.

Thus, the subscriber identity module is adapted to be capable of executing the above-mentioned method of adapting the operation of a subscriber identity module as a function of "interface" information concerning the or at least one of the interface(s) of a mobile radiocommunications terminal with which said subscriber identity module co-operates.

Furthermore, the additional means of the subscriber identity module are simple to implement, are low cost, and do not require any major restructuring compared with known subscriber identity modules.

Advantageously, said subscriber identity module includes means for temporarily storing said interface information.

Thus, this makes it possible to back up the information concerning the interface(s) that the mobile terminal uses, so as to be able to retrieve it at the appropriate time, in particular prior to sending each command which depends on the type of interface to be implemented.

Clearly, the subscriber identity module of the invention may be provided with a library containing all possible types of interface. In this way, by suitably marking the type of interface that the mobile terminal uses, after the corresponding information has been received, the subscriber identity module then knows the information that it needs.

The invention also provides a mobile radio communications terminal of the type designed to cooperate with a subscriber identity module. This mobile terminal includes:

reception means and execution means for receiving and executing an acquisition command to acquire "interface" information concerning the or at least one of the interface(s) of said terminal, said command being sent to it by said subscriber identity module, said execution making it possible to generate a reply containing interface information; and means for transmitting said reply to said subscriber identity module.

Thus, the mobile terminal of the invention is capable of receiving, analyzing, recognizing, and executing an interface information acquisition command, and then sending a reply containing the requested interface information.

Clearly, the invention does not put any constraint on the time required to perform these operations.

Likewise, the invention does not put any constraint on the need to interrupt the tasks that the terminal is executing at the time when the interface information acquisition command is received.

BRIEF DESCRIPTION OF THE DRAWINGS

Other characteristics and advantages of the invention appear on reading the following description of a preferred embodiment of the invention, given merely by way of non-limiting example, and with reference to the accompanying drawings, in which.

MORE DETAILED DESCRIPTION

In the remainder of the description, the particular case of a radiocommunications system complying with the GSM Standard is examined. Clearly, the person skilled in the art can extend the principles mentioned below to other types of radio communication system.

The invention thus relates to a method enabling the operation of a SIM to be adapted as a function of the interface(s) of a mobile terminal with which the SIM cooperates. The invention also relates to a SIM and to a terminal enabling this method to be implemented.

Figure 1:
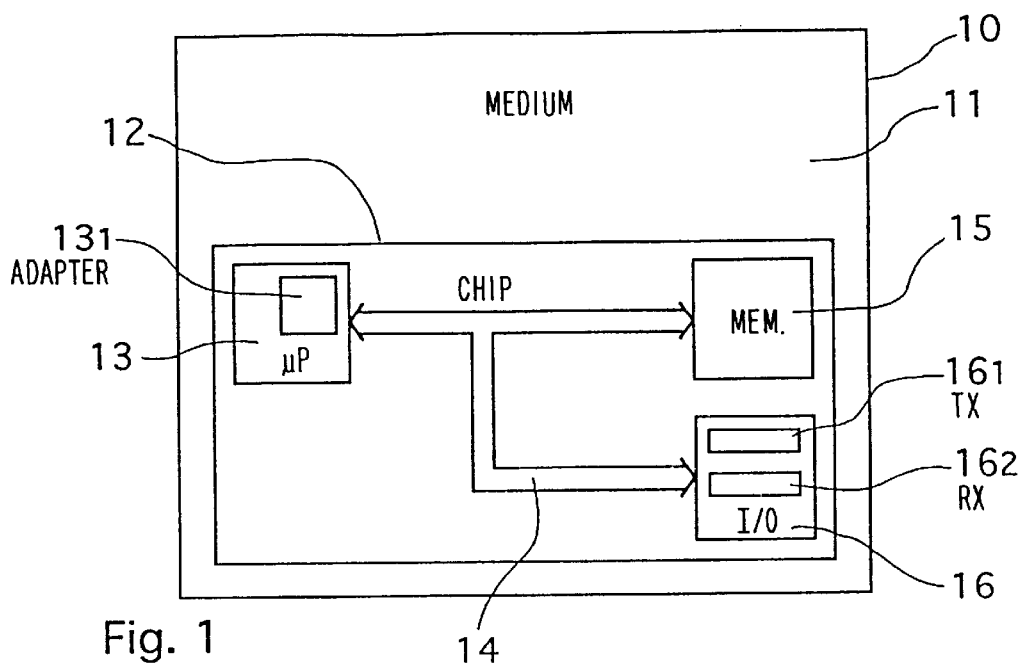
FIG. 1 is a simplified diagram showing a particular embodiment of a subscriber identity module of the invention.

A SIM (or more generally a subscriber identity module) of the invention is described below with reference to the simplified diagram of FIG. 1.

This SIM 10 is constituted, in particular, by a medium 11 which carries a semiconductive chip 12. The chip comprises, in particular, data processing and management means (e.g. a microprocessor) constituting the central decision-taking member which drives the other means of the chip 12 (shown in part at 15 and 16) via a bi-directional bus 14.

In a manner specific to the present invention, the data processing and management means further comprise, in particular, adapter means 131 for adapting the operation of the SIM. As explained in detail below, when the SIM co-operates with a terminal, the adapter means 131 for adapting the operation of the SIM act as a function of a reply from the mobile terminal to an information acquisition command to acquire information concerning the type(s) of interface used by the terminal.

Data storage means 15 on the chip 12 make it possible to back up, at least temporarily, information contained in the above-mentioned reply, and gathered by co-operation means 16. The co-operation means 16 comprise, in particular, transmit means 161 for transmitting a command to the terminal to acquire information about the interface(s) of said terminal, receive means 162 for receiving a reply from the terminal, which reply contains the requested information. The co-operation means 16 are designed to co-operate with associated co-operation means (such as a a reader 211, FIG. 2) provided on the terminal.

Figure 2:
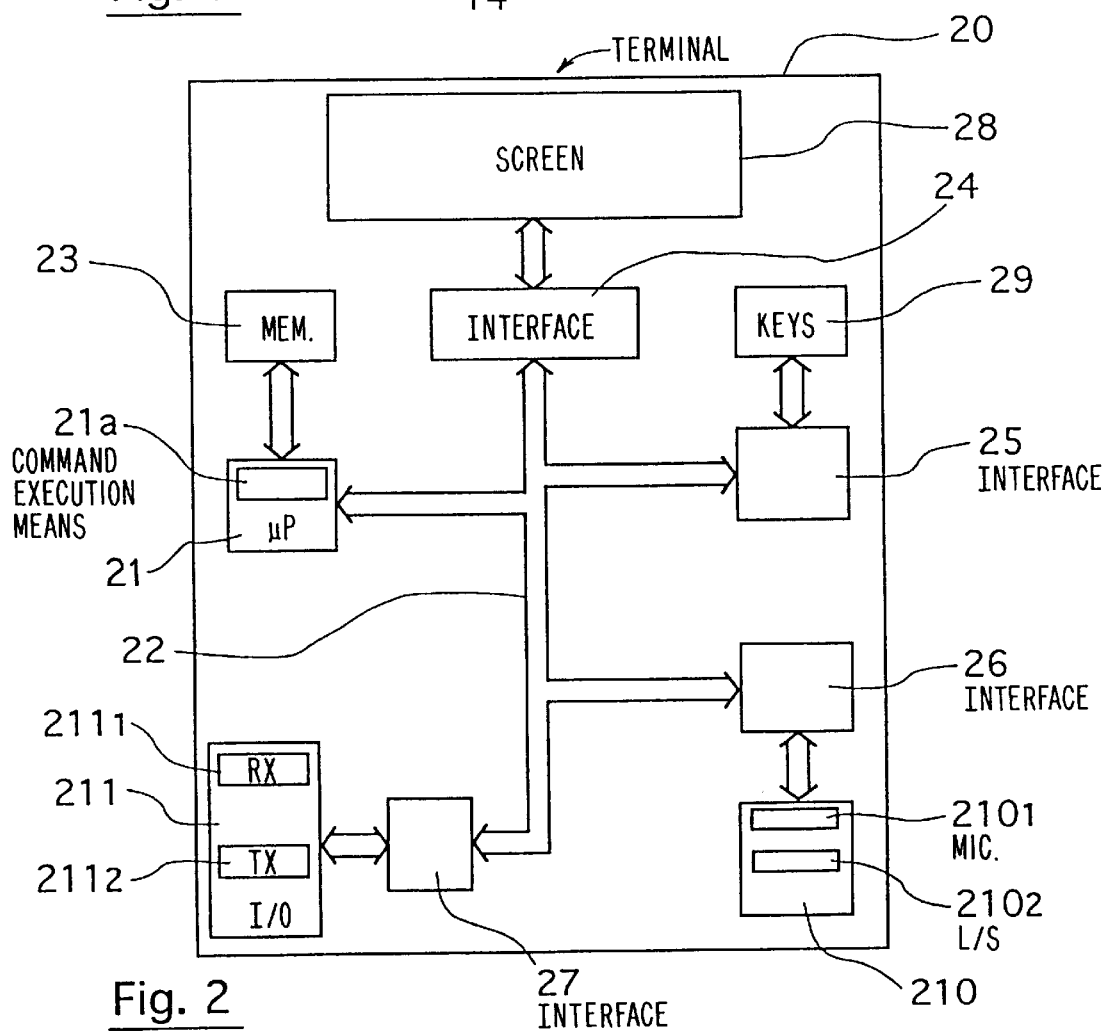
FIG. 2 is a simplified diagram of a particular embodiment of a mobile terminal of the invention for cooperating with the subscriber identity module of FIG. 1.

In the example shown in FIG. 2, the terminal 20 of the invention includes data processing and management means 21 (e.g. a microprocessor) constituting a central decision-taking member which drives the other means of the terminal via a bi-directional bus 22.

According to the invention, the data processing and management means 21 comprise command execution means 21a for executing an information acquisition command to acquire information about the type(s) of interface used by the terminal. The execution means 21a make it possible, in particular, to generate a reply, optionally after having gathered information from the various interface means. The terminal further includes data storage means 23 which are connected to the data processing and management means 21.

The data processing and management means 21 control, in particular, various interface means 24 to 27 providing interfaces respectively with the screen 28, with the keypad 29, with the microphone $210_1$, with the loudspeaker $210_2$, and with the SIM reader 211. The SIM reader 211 comprises, in particular, receive means $211_1$ for receiving an information acquisition command to acquire information concerning the various interfaces of the terminal, and transmit means $211_2$ for transmitting the associated reply.

In compliance with GSM Recommendations 11.11 and 11.14, a set of SIM application commands referred to as the "SIM Application Toolkit" is used. They comprise a set of applications and of associated procedures that can be used during a GSM session. The SIM Application Toolkit presents, in particular, the way that a SIM can interact and operate with any terminal, and, for this purpose, it incorporates the specific mechanisms required by an application.

In particular, in the context of the SIM Application Toolkit, provision is made for the SIM to store, in a file referred to as the "SIM Service Table", information that indicates that it is capable of sending to the terminal commands belonging to the group referred to as "Proactive SIM" commands that the SIM can have executed by the terminal (if the terminal is adapted accordingly). After reading the SIM Service Table, and by means of a "Terminal Profile" command, the terminal informs the SIM of the list of Proactive SIM commands that the terminal is capable of executing. The Proactive SIM commands include, in particular, DISPLAY TEXT commands to display text on the screen, and SELECT ITEM commands to select an item from a list of items.

According to the invention, the information acquisition command to acquire information about the interface(s) of the terminal is added to the list of Proactive SIM commands. In other words, the command of the invention constitutes a command additional to the set of commands in the protocol for dialog between the terminal and the SIM.

It is recalled that, conventionally, once it has been put in co-operation with the terminal, the SIM attempts to find out what the terminal is capable of performing, in particular in terms of commands. For this purpose, during a prior step, e.g. an initialization step or a step performed at any other time, a "Terminal Profile" message in a "Profile Download" procedure is sent from the terminal to the SIM. In this message, the terminal indicates to the SIM the list of commands that it is capable of recognizing and of executing. Therefore, depending on circumstances, the interface information acquisition command of the present invention might or might not be in the list.

Figure 3:
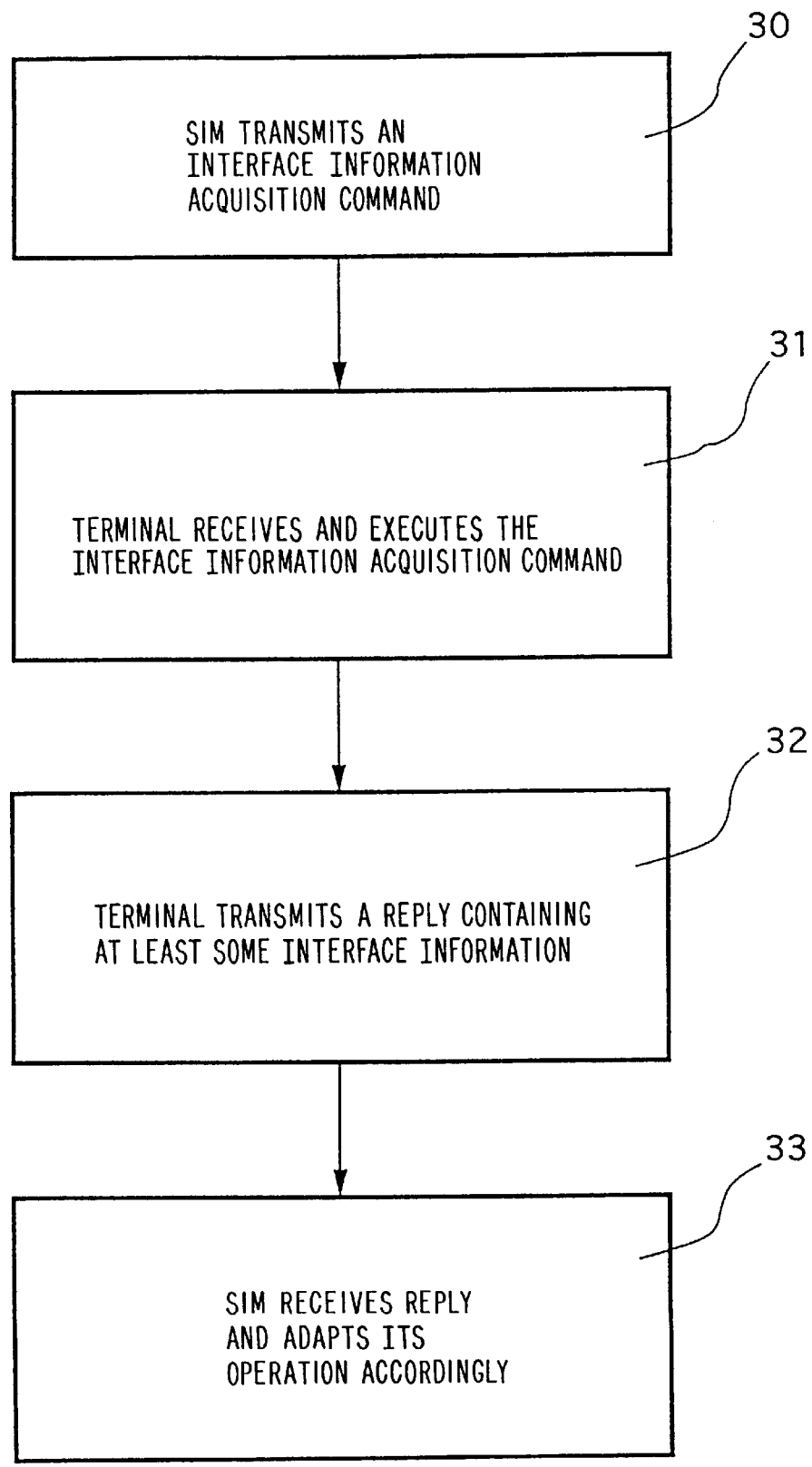
FIG. 3 is a simplified flow chart of a particular implementation of the method of the invention.

With reference to the flow chart of FIG. 3, a description follows of the method of the invention for adapting the operation of a SIM as a function of information concerning the interface(s) of a terminal with which said SIM co-operates.

This method includes the following successive steps, as shown in FIG. 3:

the SIM transmits (30) an interface information acquisition command to the terminal;

the terminal receives and executes (31) the interface information acquisition command so as to generate a reply containing interface information;

the terminal transmits (32) the reply containing interface information; and the SIM receives (33) the reply, analyzes it, and adapts its operation as a function of the contents of said reply.

The contents of the reply comprise, in particular, one or more of the following kinds of interface information: the type of display (graphics and/or text, for example), the size of the screen, the size of the screen in text terms, the type of the keypad of the terminal, the range of sound frequencies that the terminal is capable of generating or of receiving, etc.

Thus, the SIM can choose, in particular, which command to transmit out of a plurality of commands, as a function of the type(s) of interface of the terminal to which the command is addressed. For example, it is possible for the SIM to use the graphics display command(s) only, and not to use the text display command(s), if the terminal uses a graphics display interface.

Clearly, it is also possible to adapt the operation of the SIM as a function of any of the other kinds of interface information contained in the reply to the interface information acquisition command to acquire information about the interface(s) used by the terminal.

It should be noted that, although the above description corresponds more particularly to the case when the interface information acquisition command is stored in the "Proactive SIM" file of the SIM. It is also possible to store this command in other files of the SIM. In another variant, on initializing the interaction between the terminal and the SIM, the terminal systematically and in unsolicited manner (without a command from the SIM) sends a message containing interface information.

What is claimed is:

1. A method for adapting the operation of a subscriber identity module to one or more interfaces of a radio communications terminal with which said subscriber identity module co-operates, said method comprising the steps of transmitting an interface information acquisition command from said subscriber identity module;

receiving said interface information acquisition command at said terminal;

executing said interface information acquisition command at said terminal to generate a reply containing interface information;

transmitting said reply from said terminal to said subscriber identity module; and receiving said reply at said subscriber identity module and adapting operation of said subscriber identity module based on said interface information contained in said reply.

2. A method according to claim 1, wherein said interface information comprises at least one of:

a type of display of said terminal;

a size of a screen of said terminal;

a size in text terms of the screen of said terminal;

a type of keypad of said terminal;

a range of sound frequencies that said terminal is capable of generating; and a range of sound frequencies that said terminal is capable of receiving.

3. A method according to claim 1, wherein said interface information acquisition command comprises a command which is additional to a set of commands in a protocol for communications between said terminal and said subscriber identity module.

4. A method according to claim 1, further comprising, prior to said step of transmitting an interface information acquisition command from said subscriber identity module providing an indication to said subscriber identity module of whether said terminal is capable of executing said interface information acquisition command.

5. A subscriber identity module which co-operates with a mobile radio communications terminal, said subscriber identity module comprising:

a transmitter for transmitting an information acquisition command to said terminal to acquire information regarding an interface of said terminal;

a receiver for receiving a reply sent by said terminal in response to said acquisition command, said reply containing said information regarding said interface of said terminal; and a processor for adapting operation of said subscriber identity module based on said information regarding said interface contained in said reply received from said terminal.

6. A subscriber identity module according to claim 5, further comprising a memory for temporarily storing said interface information.

7. A mobile radio communications terminal operates with a subscriber identity module, said terminal comprising:

a receiver for receiving an acquisition command to acquire information regarding an interface of said terminal, said command being sent to said terminal by said subscriber identity module;

a processor for executing said acquisition command to thereby generate a reply to said acquisition command containing interface information; and a transmitter for transmitting said reply to said subscriber identity module.

* * * * *